United States Patent [19]
Kawamura et al.

[11] Patent Number: 5,229,983
[45] Date of Patent: Jul. 20, 1993

[54] BIAS MAGNETIC FIELD GENERATING APPARATUS FOR MAGNETO-OPTICAL RECORDING AND REPRODUCING SYSTEM

[75] Inventors: Ichiro Kawamura; Goro Naoki; Yukinori Okazaki; Ryoichi Imanaka, all of Osaka, Japan

[73] Assignee: Matsushita Electric Industrial Co., Ltd., Osaka, Japan

[21] Appl. No.: 634,765

[22] Filed: Dec. 27, 1990

[30] Foreign Application Priority Data

Dec. 28, 1989 [JP] Japan .................. 1-342677
Nov. 28, 1990 [JP] Japan .................. 2-332356

[51] Int. Cl.⁵ .................. G11B 13/04; G11B 11/12
[52] U.S. Cl. .................. 369/13; 360/59; 360/114
[58] Field of Search .................. 369/13; 360/59, 66, 360/114

[56] References Cited

U.S. PATENT DOCUMENTS

| | | | |
|---|---|---|---|
| 4,701,895 | 10/1987 | VanSant | 360/59 |
| 4,748,606 | 5/1988 | Naito et al. | 369/13 |
| 4,962,492 | 10/1990 | Mathildus et al. | 369/13 |
| 4,972,337 | 11/1990 | Eguchi et al. | 369/13 |
| 4,984,224 | 1/1991 | Tsuyuguchi et al. | 369/13 |
| 5,038,330 | 8/1991 | Tanaka | 369/13 |

FOREIGN PATENT DOCUMENTS

| | | | |
|---|---|---|---|
| 0222916 | 5/1987 | European Pat. Off. | |
| 0290281 | 11/1988 | European Pat. Off. | |
| 57-24047 | 2/1982 | Japan . | |
| 59-54003 | 3/1984 | Japan | 360/59 |
| 59-92406 | 5/1984 | Japan . | |
| 59-146408 | 8/1984 | Japan . | |
| 60-226044 | 11/1985 | Japan | 369/13 |
| 63-34757 | 2/1988 | Japan | 360/114 |
| 2083677 | 1/1985 | United Kingdom . | |

Primary Examiner—Robert W. Beausoliel, Jr.
Attorney, Agent, or Firm—Pollock, VandeSande & Priddy

[57] ABSTRACT

An apparatus for generating a bias magnetic field to a magneto-optical disk includes a movable magnet which serves to generate a bias magnetic field. A suitable device serves to generate a drive magnetic field to move the magnet. A stopper is engageable with the magnet to stop the magnet at a predetermined position.

6 Claims, 11 Drawing Sheets

BIAS MAGNETIC FIELD GENERATING APPARATUS FOR MAGNETO-OPTICAL RECORDING AND REPRODUCING SYSTEM

BACKGROUND OF THE INVENTION

This invention relates to a bias magnetic field generating apparatus usable in magneto-optical recording and reproducing systems.

Magneto-optical disks (Opto-magnetic disks) have been widely used as information recording media for computers. During the writing of information into a magneto-optical disk or the erasion of information from the disk, it is necessary to apply a bias magnetic field of a given strength or greater to the disk along a direction perpendicular to a recording surface of the disk. In addition, it is necessary to invert the polarity of the bias magnetic field between the information writing period and the information erasing period.

As will be explained later, a prior art apparatus for generating such a bias magnetic field has some problems.

SUMMARY OF THE INVENTION

It is an object of this invention to provide an improved bias magnetic field generating apparatus.

A first aspect of this invention provides an apparatus for generating a bias magnetic field to a magneto-optical disk, comprising a movable magnet for generating a bias magnetic field; means for generating a drive magnetic field to move the magnet; and a stopper engageable with the magnet to stop the magnet at a predetermined position.

A second aspect of this invention provides an apparatus for generating a bias magnetic field to a magneto-optical disk, comprising a magnet, being movable into a predetermined position, for generating a bias magnetic field; a winding for generating a drive magnetic field to move the magnet into the predetermined position; means for supplying an electric current to the winding to energize the winding; means for reversing the electric current to decelerate the magnet before the magnet is moved into the predetermined position.

DESCRIPTION OF THE PRIOR ART

Figure 1:
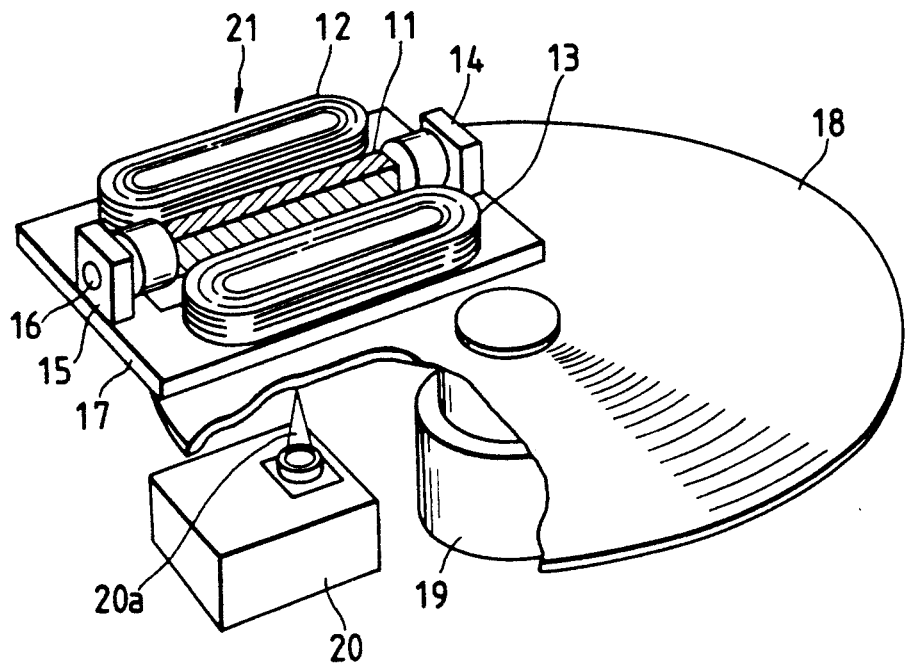
FIG. 1 is a perspective, partially cut-away, view of a prior art magneto-optical recording and reproducing system including a bias magnetic field generating apparatus.

As shown in FIG. 1, a prior art magneto-optical recording and reproducing system includes a magneto-optical disk 18 which can be rotated by a spindle motor 19. A head 20 applies a laser light 20a to a recording surface of the magneto-optical disk 18, recording and reproducing a signal into and from the disk 18. The prior art recording and reproducing system includes a bias magnetic field generating apparatus 21 located above the magneto-optical disk 18.

Figure 2:
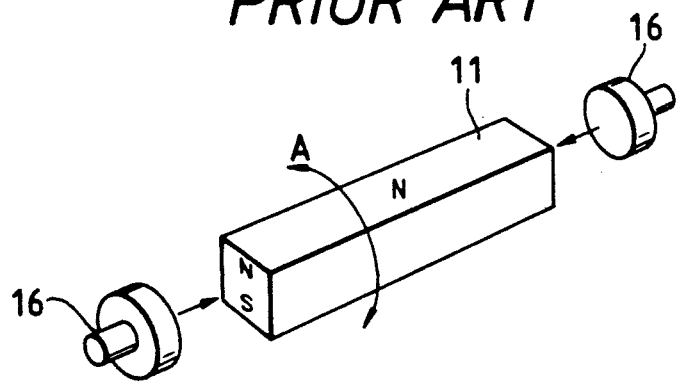
FIG. 2 is an exploded view of a portion of the bias magnetic field generating apparatus of FIG. 1.

The bias magnetic field generating apparatus 21 has a square-bar permanent magnet 11, windings 12 and 13, bearings 14 and 15, a pair of support members 16, and a base 17. The devices and members 11-16 are supported on the base 17. As understood from FIG. 2, the support members 16 are fixed to opposite end faces of the magnet 11 respectively. The support members 16 are rotatably held by the bearings 14 and 15 which are mounted on the base 17. The magnet 11 can rotate about its longitudinal axis in directions denoted by the arrows A. The windings 12 and 13 are mounted on the base 17 and are located at sides of the magnet 11 respectively.

Figure 3:
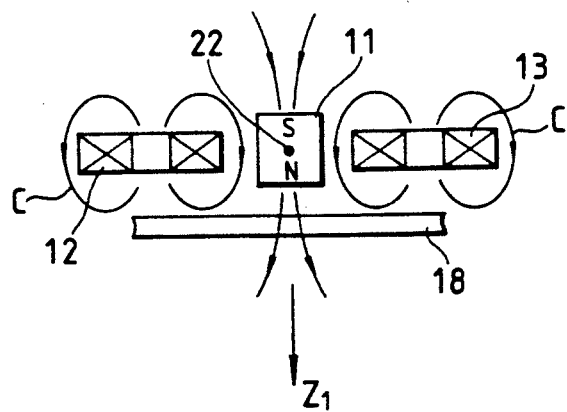
FIGS. 3-6 are sectional diagrams of a portion of the bias magnetic field generating apparatus of FIG. 1.

Under an initial state, as shown in FIG. 3, the windings 12 and 13 are energized to generate magnetic fields C (which are represented by magnetic lines of force), and the magnet 11 remains stable with its S pole and N pole assuming an upper position and a lower position respectively. Under the initial state of FIG. 3, a bias magnetic field extending along a direction Z1 is applied by the magnet 11 to the magneto-optical disk 18. In FIG. 3, the numeral 22 denotes the center of rotation of the magnet 11.

Figure 4:
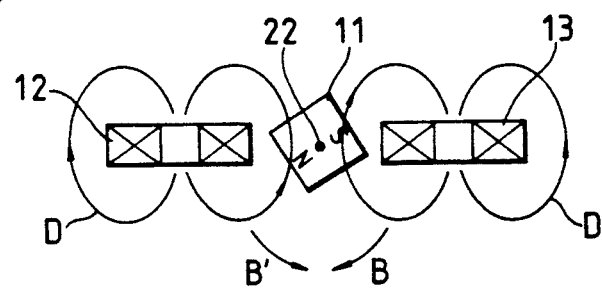
Figure 5:
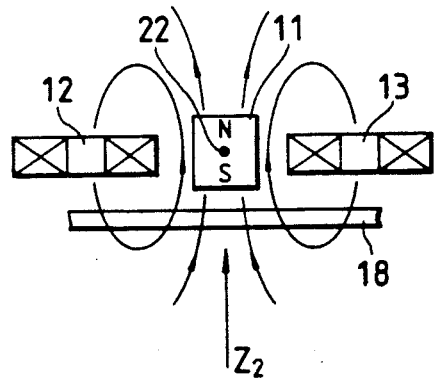

When energizing the windings 12 and 13 are changed from the initial conditions of FIG. 3 to generate reversed magnetic fields D as shown in FIG. 4, the magnet 11 rotates in a direction B or a direction B'. After the rotation, as shown in FIG. 5, the magnet 11 becomes and then remains stable with its S pole and N pole assuming a lower position and an upper position respectively. Under the stable state of FIG. 5, a bias magnetic field extending along a direction Z2 opposite to the direction Z1 is applied by the magnet 11 to the magneto-optical disk 18.

In this way, the magnet 11 is inverted by controlling the energizing the windings 12 and 13, and the polarity or the direction of the magnetic field applied to the magneto-optical disk 18 is reversed upon the inversion of the magnet 11. For example, writing a signal into the magneto-optical disk 18 is executed under the state of FIG. 3, while erasing a signal from the magneto-optical disk 18 is executed under the state of FIG. 5.

Figure 6:
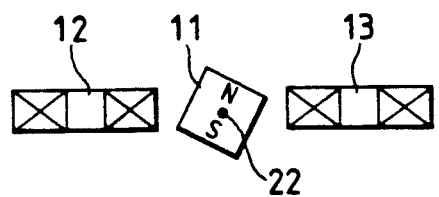

In the prior art bias magnetic field generating apparatus 21 of FIG. 1, during the inversion of the bias magnetic field by the rotation of the magnet 11 from the position of FIG. 3 to the position of FIG. 5, the magnet 11 overshoots the good position of FIG. 5 by inertia and reaches a wrong position of FIG. 6 before the magnet 11 stops at the good position of FIG. 5. Thus, it takes a long time to complete the inversion of the bias magnetic field. In addition, the inversion of the bias magnetic field requires a rotation of the magnet 11 through 180 degrees, and such a wide-angle rotation of the magnet 11 causes a significant obstacle to the realization of a quick inversion of the bias magnetic field.

In the prior art bias magnetic field generating apparatus 21 of FIG. 1, it is necessary to hold the windings 12 and 13 energized at all times. This causes a problem in electric power economy.

DESCRIPTION OF THE FIRST PREFERRED EMBODIMENT

Figure 7:
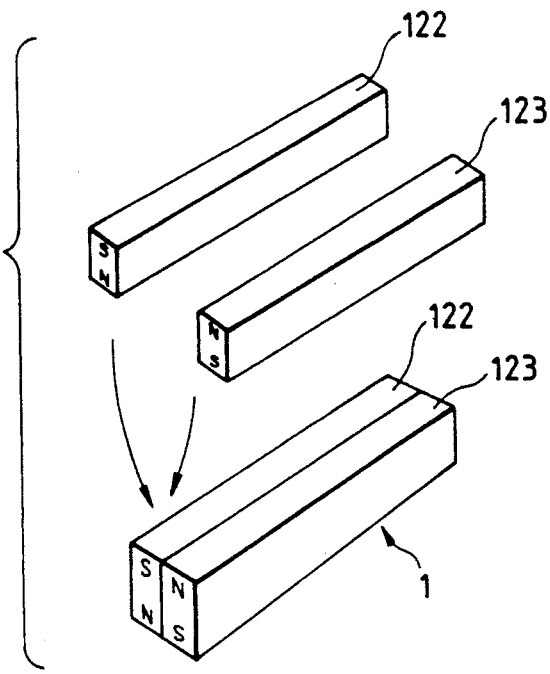
FIG. 7 includes an exploded view and a perspective view of a magnet in a bias magnetic field generating apparatus according to a first embodiment of this invention.

As shown in FIG. 7, a straight-bar permanent magnet 1 having a rectangular or square cross section is composed of a pair of elongated halves 122 and 123 bonded together at their opposing side surfaces. In each of the halves 122 and 123, an S pole and an N pole are separated in a direction along a width of the half 122 or 123, and the S pole and the N pole appear at each end face of the half 122 or 123. This pole-separated arrangement remains unchanged between each end face of the half 122 or 123 and a cross section of the half 122 and 123. One of adjacent end faces of the halves 122 and 123 has a pole arrangement as "S-N", while the other has a reverse pole arrangement as "N-S". Thus, a first pair of opposite corners of each end face of the magnet 1 has the N poles while a second pair of opposite corners of each end face of the magnet 1 has the S poles. This pole-separated arrangement remains unchanged between each end face of the magnet 1 and a cross section of the magnet 1. In this way, the magnet 1 has a 4-pole separated structure.

Figure 8:
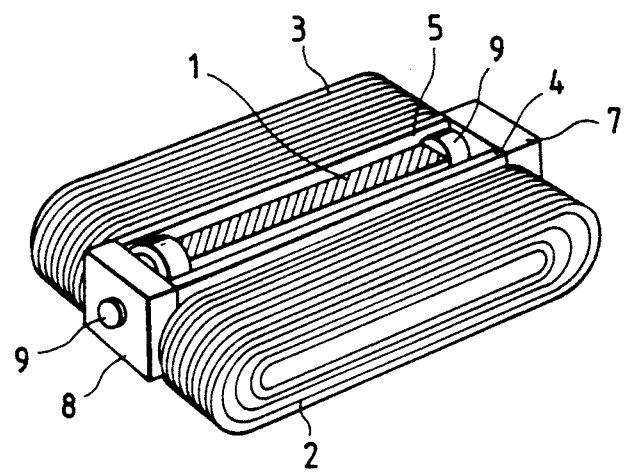
FIG. 8 is a perspective view of the bias magnetic field generating apparatus according to the first embodiment of this invention.
Figure 9:
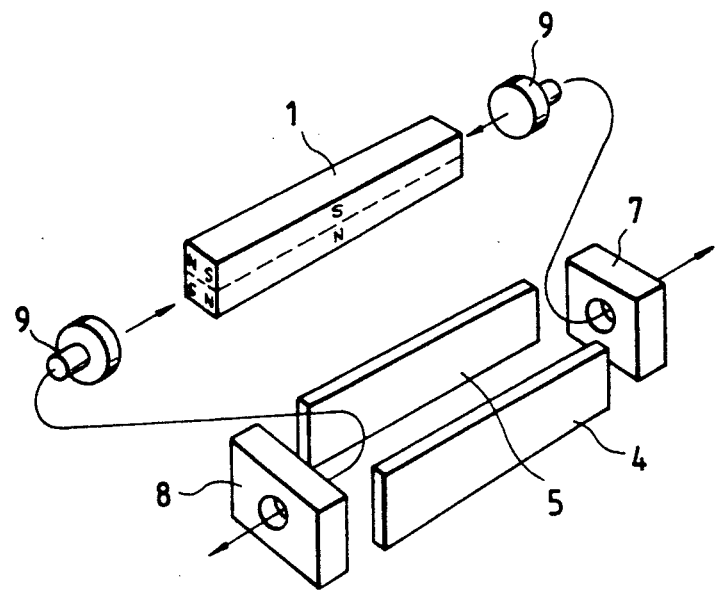
FIG. 9 is an exploded view of a portion of the bias magnetic field generating apparatus of FIG. 8.

As shown in FIGS. 8 and 9, a pair of plates 4 and 5 and a pair of bearings 7 and 8 are combined to compose a rectangular frame. The plates 4 and 5 form opposite sides of the frame. The plates 4 and 5 are made of non-magnetic material. A pair of support members 9 are fixed to the opposite end faces of the magnet 1 respectively. The support members 9 are rotatably held by the bearings 7 and 8 respectively. The magnet 1 is accommodated in the frame. The magnet 1 can rotate about its longitudinal central line. As will be made clear later, the plates 4 and 5 serve as stoppers for the magnet 1. Windings 2 and 3 are attached to the outer surfaces of the plates 4 and 5 respectively. Thus, the windings 2 and 3 are located at opposite sides of the magnet 1. The magnet 1 and the windings 2 and 3 are positioned above a magneto-optical disk.

Figure 10:
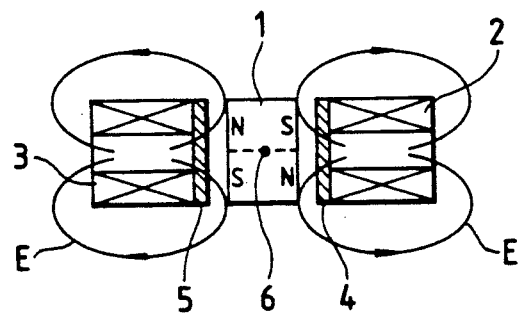
FIGS. 10-12 are sectional diagrams of a portion of the bias magnetic field generating apparatus of FIG. 8.
Figure 11:
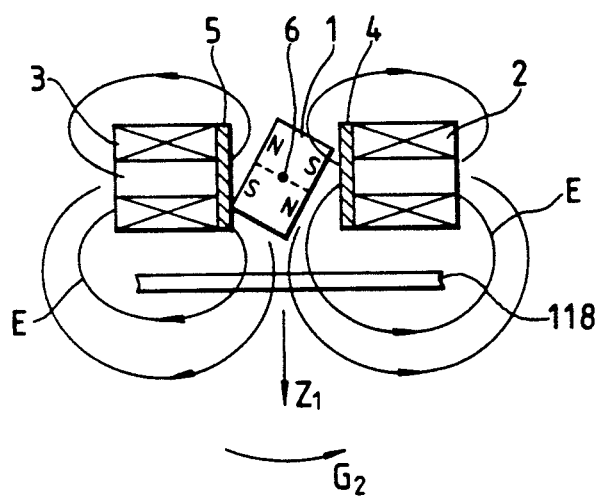

It is now assumed that the magnet 1 is in a neutral position of FIG. 10. When the windings 2 and 3 are energized to generate magnetic fields E (which are represented by magnetic lines of force), the S poles of the magnet 1 are attracted toward the near windings 2 and 3 while the N poles of the magnet 1 are repelled away from the near windings 2 and 3 respectively so that the magnet 1 rotates from the neutral position of FIG. 10 in a direction G1. In FIG. 10, the numeral 6 denotes the center of rotation of the magnet 1. The magnet 1 continues to rotate until the magnet 1 encounters the plates 4 and 5. As shown in FIG. 11, when the magnet 1 encounters the plates 4 and 5, the magnet 1 is stopped at a first predetermined effective position by the plates 4 and 5. During this rotation of the magnet 1, the magnetic fields generated by the windings 2 and 3 act on the magnet 1 in a push-pull manner. Therefore, the magnetic fields from the windings 2 and 3 are effectively used for the rotation of the magnet 1. When the magnet 2 is in its first effective position of FIG. 11, the magnetic fields generated by the magnet 1 and the windings 2 and 3 compose a resultant bias magnetic field which extends in a direction Z1 perpendicular to a recording surface of a magneto-optical disk 118. The rotation of the magnet 1 from the neutral position of FIG. 10 to the first effective position of FIG. 11 corresponds to a predetermined angle of about 45 degrees or less.

Figure 12:
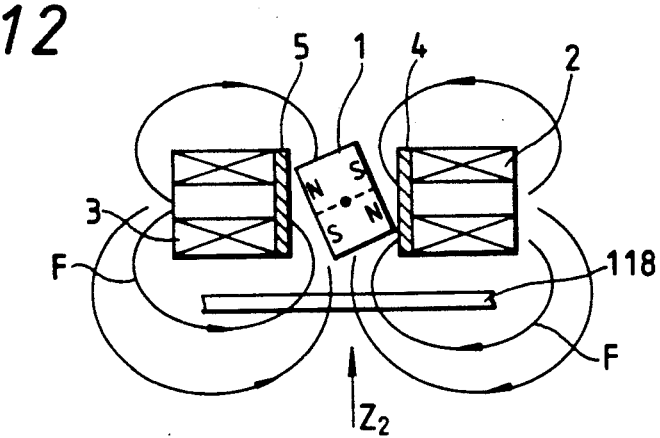

During a subsequent period, when electric currents to the windings 2 and 3 are reversed to invert the energized conditions of the windings 2 and 3, the windings 2 and 3 generate magnetic fields F opposite to the magnetic fields E as shown in FIG. 12. As a result, the N poles of the magnet 1 are attracted toward the opposing windings 2 and 3 respectively while the S poles of the magnet 1 are repelled away from the near windings 2 and 3 respectively, and the magnet 1 rotates from the first effective position of FIG. 11. The magnet 1 continues to rotate until the magnet 1 encounters the plates 4 and 5. As shown in FIG. 12, when the magnet 1 encounters the plates 4 and 5, the magnet 1 is stopped at a second predetermined effective position by the plates 4 and 5. During this rotation of the magnet 1, the magnetic fields generated by the windings 2 and 3 on the magnet 1 in a push-pull manner. Therefore, the magnetic fields from the windings 2 and 3 are effectively used for the rotation of the magnet 1. When the magnet 1 is in its second effective position of FIG. 12, the magnetic fields generated by the magnet 1 and the windings 2 and 3 compose a resultant bias magnetic field which extends in a direction Z2 perpendicular to a recording surface of the magneto-optical disk 118 and opposite to the direction Z1. The rotation of the magnet 1 from the first effective position of FIG. 11 to the second effective position of FIG. 12 corresponds to a predetermined angle of about 90 degrees or less.

Since the plates 4 and 5 serve as stoppers for the magnet 1, the magnet 1 is prevented from overshooting the first and second effective positions due to inertia so that the magnet 1 can be quickly stopped at the first and second effective positions. The quick stop of the magnet 1 at the first and second effective positions results in a quick inversion of the magnetic field applied to the magneto-optical disk 118. In addition, since the inversion of the magnetic field applied to the magneto-optical disk 118 is realized by the rotation of the magnet 1 which corresponds to a smaller angle than the prior art, the inversion of the magnetic field can be executed more quickly than the prior art.

Figure 13:
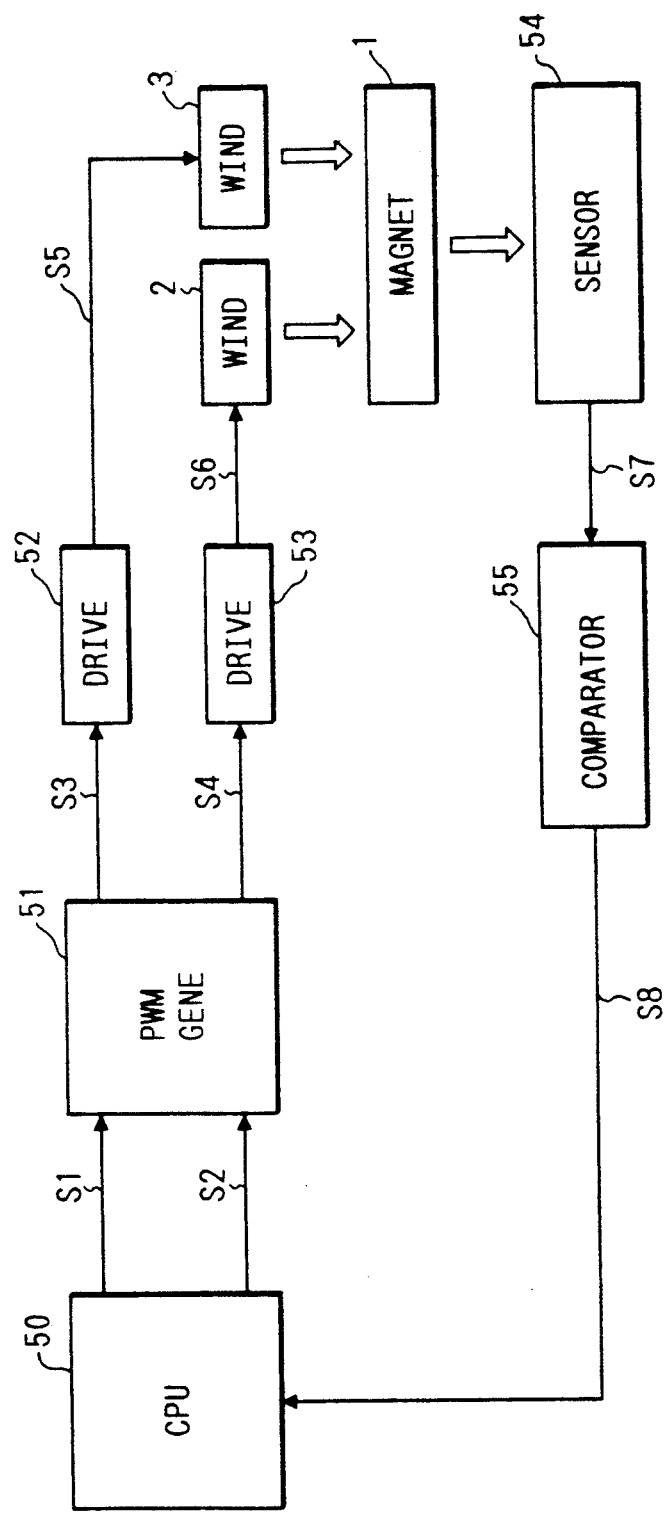
FIG. 13 is a block diagram of an electric control circuit of the bias magnetic field generating apparatus according to the first embodiment.

As shown in FIG. 13, a control circuit includes a CPU 50, a PWM (pulse-width modulation) signal generator 51, drive amplifiers 52 and 53, a magnetic field sensor 54, and a comparator 55. The CPU 50 outputs signals S1 and S2 to the PWM signal generator 51. The signal S1 is a base PWM signal having a desired duty cycle, that is, a desired pulse width. The signal S2 is a binary signal representing a desired direction of a rotational force to the magnet 1. The PWM signal generator 51 generates PWM signals S3 and S4 in response to the signals S1 and S2. The PWM signal generator 51 includes a logic circuit. The PWM signals S3 and S4 have a duty cycle equal to the desired duty cycle represented by the signal S1. The polarities or signs of the PWM signals S3 and S4 are determined by the desired direction of the rotational force to the magnet 1 which is represented by the signal S2. The PWM signals S3 and S4 are amplified into PWM signals S5 and S6 by the drive amplifiers 52 and 53 respectively. The PWM signals S5 and S6 are outputted from the drive amplifiers 52 and 53 to the windings 2 and 3 respectively. The windings 2 and 3 are driven by the PWM signals S5 and S6 so that the windings 2 and 3 are controlled in response to the PWM signals S5 and S6.

The magnetic field sensor 54 is fixed in a position close to a side of the magnet 1 which is remote from the magneto-optical disk 118. The position of the magnetic field sensor 54 relative to the positions of the magnet 1 and the windings 2 and 3 is chosen so that the magnetic field sensor 54 can be exposed to a magnetic field of a strength equal to the strength of the magnetic field applied to the magneto-optical disk 118. The magnetic field sensor 54 detects the magnetic field and outputs a signal S7 representing the strength and the polarity of the detected magnetic field. For example, the magnetic field sensor 54 is composed of a Hall element. The output signal S7 from the magnetic field sensor 54 is fed to the comparator 55. The comparator 55 compares the signal S7 with a predetermined reference signal, converting the signal S7 into a binary signal S8 representing the polarity of the detected magnetic field. The signal S8 is outputted from the comparator 55 to the CPU 50.

Figure 14:
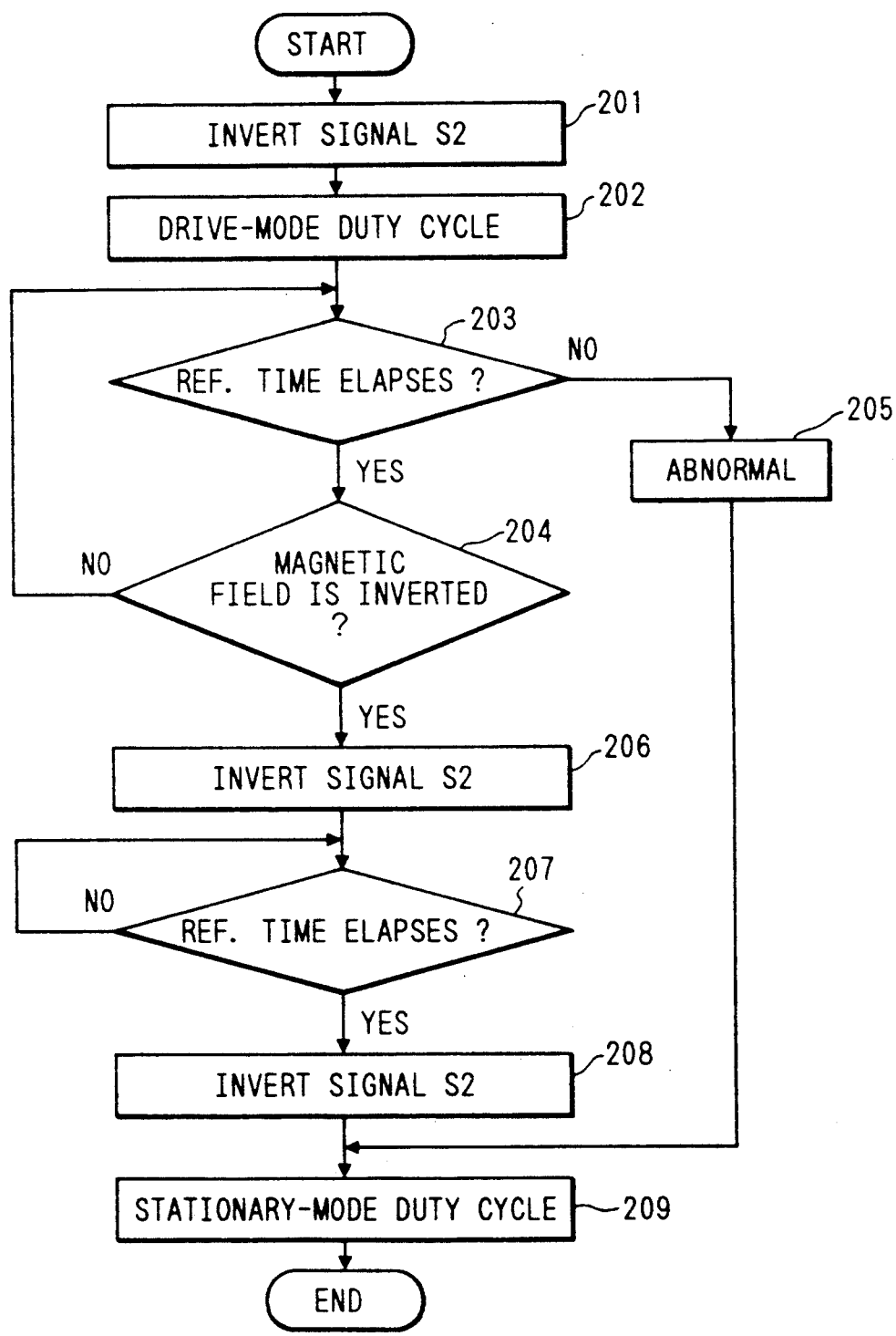
FIG. 14 is a flowchart of a segment of a program controlling the CPU of FIG. 13.

The CPU 50 includes a ROM storing a control program. The CPU 50 operates in accordance with the control program. The control program has a segment which is executed when the inversion of the magnetic field applied to the magneto-optical disk 118 is required. FIG. 14 is a flowchart of this segment of the control program.

As shown in FIG. 14, a first step 201 of the segment of the control program inverts the signal S2 representing the desired direction of the rotational force to the magnet 1. A step 202 following the step 201 sets the duty cycle of the base PWM signal S1 to a predetermined drive-mode duty cycle in order to rotate the magnet 1 from the first or second effective position. After the step 202, the program advances to a step 203. The step 203 decides whether or not the time elapsed from the end of the preceding step 202 is in a predetermined reference time corresponding to an allowable time for an inversion of the magnetic field. When the time elapsed is in the reference time, the program advances to a step 204. When the time elapsed is not in the reference time, the program advances to a step 205. The step 204 decides whether or not the state of the signal S8 representing the polarity of the magnetic field is inverted. When the state of the signal S8 is inverted, the program advances to a step 206. When the state of the signal S8 is not inverted, the program returns to the step 203. Thus, in cases where the polarity of the detected magnetic field is inverted in the reference time after the setting of the duty cycle of the base PWM signal S1 to the drive-mode duty cycle, the program advances to the step 206. Otherwise, the program advances to the step 205.

The step 206 inverts the signal S2 representative of the desired direction of the rotational force to the magnet 1 in order to decelerate the magnet 1. After the step 206, the program advances to a step 207. The step 207 decides whether or not the time elapsed from the end of the preceding step 206 is equal to a predetermined reference time corresponding to a desired time for a deceleration of the magnet 1. When the time elapsed to equal to the reference time, the program advances to a step 208. When the time elapsed is not equal to the reference time, the program returns to the step 207. Thus, the deceleration of the magnet 1 is kept for the desired time. The step 208 inverts the signal S2 representative of the desired direction of the rotational force to the magnet 1 in order to suspend the deceleration of the magnet 1. After the step 208, the program advances to a step 209. The step 209 sets the duty cycle of the base PWM signal S1 to a predetermined stationary-mode duty cycle which is smaller than the drive-mode duty cycle in order to reduce the electric power consumed by the windings 2 and 3. The stationary-mode duty cycle is chosen so that the magnet 1 can be stably held in the first effective position or the second effective position. After the step 209, the segment of the control program ends and the program returns to a main routine.

The step 205 executes a suitable process for an abnormal operation. After the step 205, the program jumps to the step 209.

Figure 15:
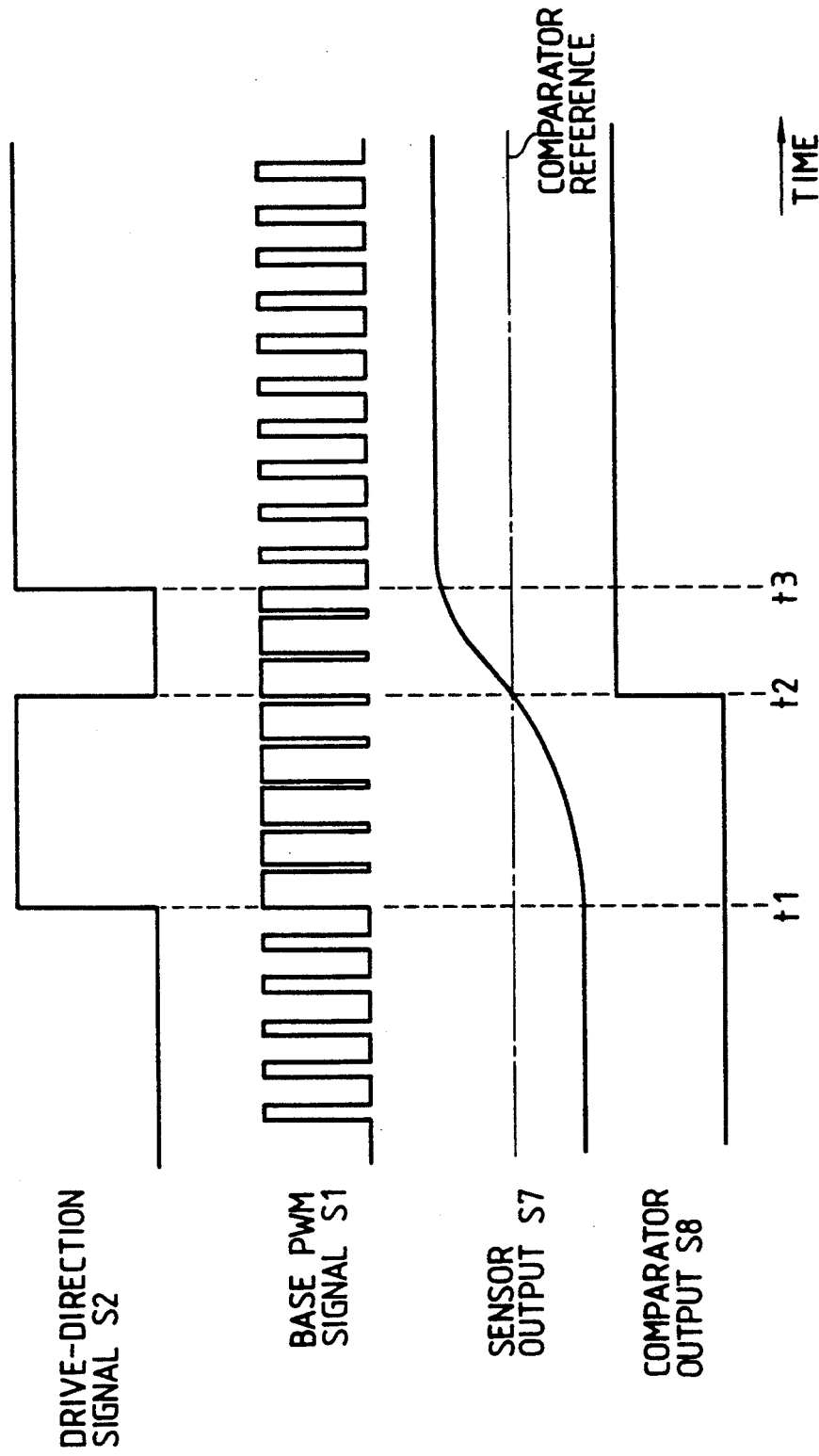
FIGS. 15 and 16 are timing diagrams showing the waveforms of various signals in the control circuit of FIG. 13.
Figure 16:
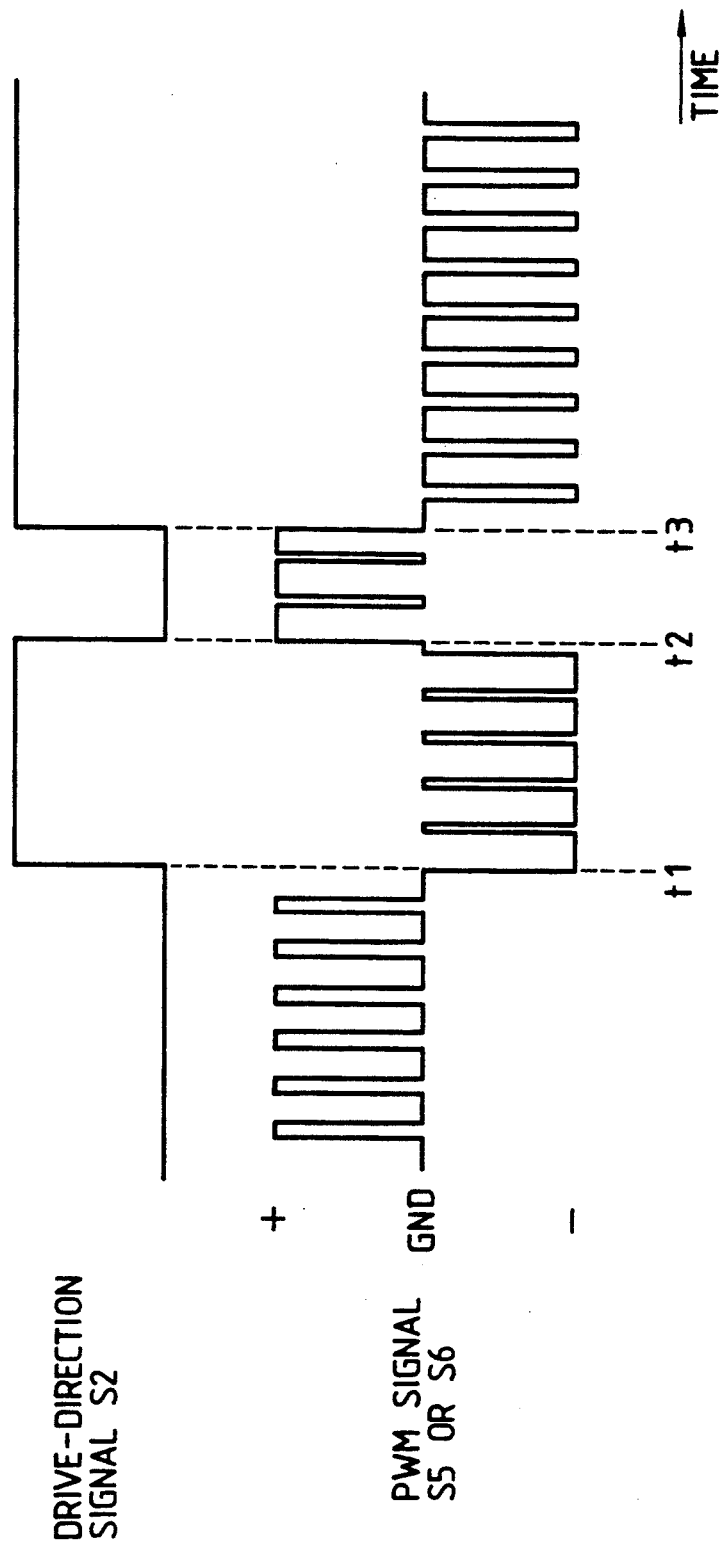

The inversion of the magnet 1 will be further described hereinafter. It is now assumed that the magnet 1 is initially in the second effective position of FIG. 12, and the S pole of the magnet 1 opposes the magneto-optical disk 118 and the magnetic field along the direction Z2 is applied to the magneto-optical disk 118. Under these initial conditions, as shown in FIGS. 15 and 16, the signal S2 representing the desired direction of a rotational force to the magnet 1 is in a low level and the base PWM signal S1 has the stationary-mode duty cycle. In addition, the level of the sensor output signal S7 is smaller than the comparator reference level so that the comparator output signal S8 is in a low level.

At a moment t1, the CPU 50 is informed of an instruction of inverting the magnetic field. As shown in FIGS. 15 and 16, at the moment t1, the CPU 50 changes the drive-direction signal S2 to a high level so that the drive signal S5 and S6 to the windings 2 and 3 are reversed in sign. In addition, at the moment t1, the CPU 50 increases the duty cycle of the base PWM signal S1 to the drive-mode duty cycle so that the duty cycle of the drive signal S5 and S6 are increased commensurately. The magnet 1 is rotated from the second effective position of FIG. 12 toward the first effective position of FIG. 11 in response to the changes of the drive signals S5 and S6. As the magnet 1 rotates, the magnetic field applied to the magneto-optical disk 118 varies and then becomes null at a moment t2. As shown in FIG. 15, at the moment t2, the level of the sensor output signal S7 reaches the comparator reference level so that the comparator output signal S8 changes to a high level. As shown in FIGS. 15 and 16, the CPU 50 returns the drive-direction signal S2 to the low level in response to the change of the comparator output signal S8 to the high level. The return of the drive-direction signal S2 to the low level results in reverses of the signs of the drive signals S5 and S6 to the windings 2 and 3, so that the magnet 1 is decelerated or braked. The deceleration of the magnet 1 is kept for the predetermined reference time which expires at a moment t3. As a result of the deceleration of the magnet 1, the magnet can be quickly and smoothly moved into the first effective position of FIG. 11.

As shown in FIGS. 15 and 16, at the moment t3, the CPU 50 returns the drive-direction signal S2 to the low level in response to the change of the comparator output signal S8 to the high level. Simultaneously, the CPU 50 decreases the duty cycle of the base PWM signal 1 to the stationary-mode duty cycle so that the duty cycle of the drive signals S5 and S6 to the windings 2 and 3 are decreased commensurately. The return of the drive-direction signal S2 to the high level results in reverses of the signs of the drive signals S5 and S6, so that the magnet 1 can be stably held in the first effective position of FIG. 11 where the N pole of the magnet 1 opposes the magneto-optical disk 118 and the magnetic field along the direction Z1 is applied to the magneto-optical disk 118.

In cases where the magnetic field applied to the magneto-optical disk 118 depends on the direction of rotation of the magnet 1, predetermined hysteresis characteristics are provided to the comparator 55 to compensate the dependence of the magnetic field on the direction of rotation of the magnet 1.

It is preferable that, during the reading of a signal from the magneto-optical disk 118, the drive signals S5 and S6 are controlled in response to the sensor output signal S7 so as to minimize the magnetic field applied to the magneto-optical disk 118.

A return spring acting on the magnet 1 may be provided. While the windings 2 and 3 remains de-energized, the return spring holds the magnet 1 in a position where the N pole and the S pole of the magnet 1 equally oppose the magneto-optical disk 118.

DESCRIPTION OF THE OTHER PREFERRED EMBODIMENTS

Figure 17:
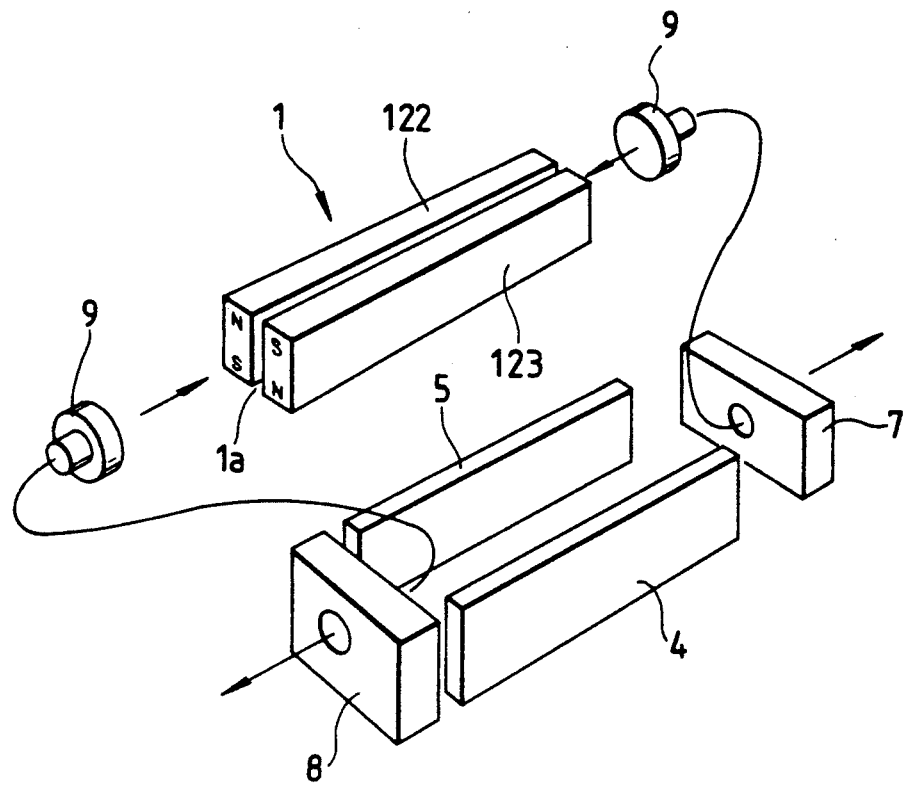
FIG. 17 is an exploded view of a portion of a bias magnetic field generating apparatus according to a second embodiment of this invention.

FIG. 17 shows a second embodiment of this invention which is similar to the embodiment of FIGS. 7-16 except that halves 122 and 123 of a magnet 1 are separated from each other by a given gap 1a which is designed so as to optimize the distribution of a magnetic field applied to a magneto-optical disk.

Figure 18:
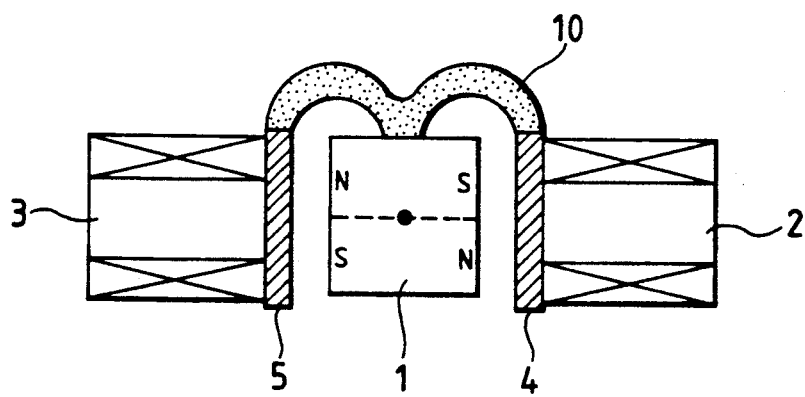
FIG. 18 is a sectional diagram of a portion of a bias magnetic field generating apparatus according to a third embodiment of this invention.

FIG. 18 shows a third embodiment of this invention which is similar to the embodiment of FIGS. 7-16 except that a rubber spring 10 attached to plates 4 and 5 serves as a means for urging and centering a magnet 1. While windings 2 and 3 remains de-energized, the rubber spring 10 holds the magnet 1 in a position where the N pole and the S pole of the magnet 1 equally oppose a magneto-optical disk 118.

Figure 19:
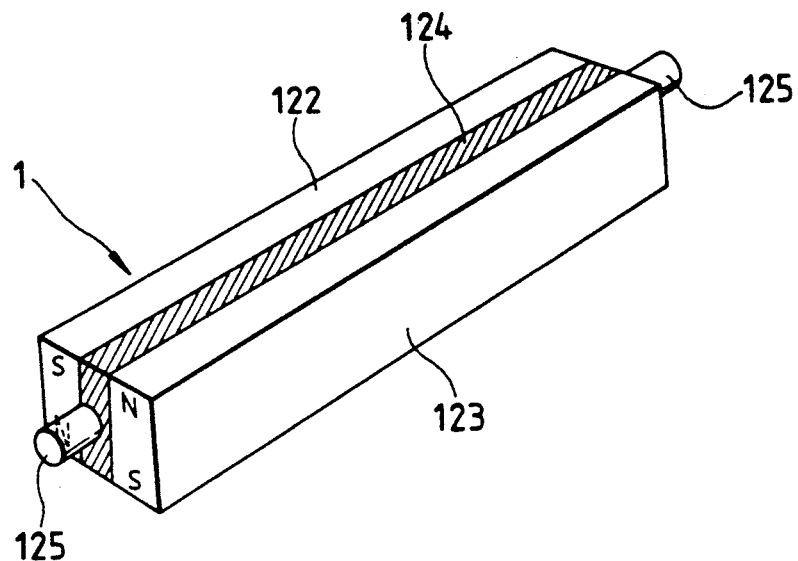
FIG. 19 is a perspective view of a portion of a bias magnetic field generating apparatus according to a fourth embodiment of this invention.

FIG. 19 shows a fourth embodiment of this invention which is similar to the embodiment of FIGS. 7-16 except for design changes explained hereinafter. In the embodiment of FIG. 19, a magnet 1 is composed of magnet members 122 and 123 and a non-magnetic member 124 bonded together. The non-magnetic member 124 extends between the magnet members 122 and 123. A pair of shafts 125 supported by bearings (not shown) are fixed to opposite ends of the non-magnetic member 124.

Figure 20:
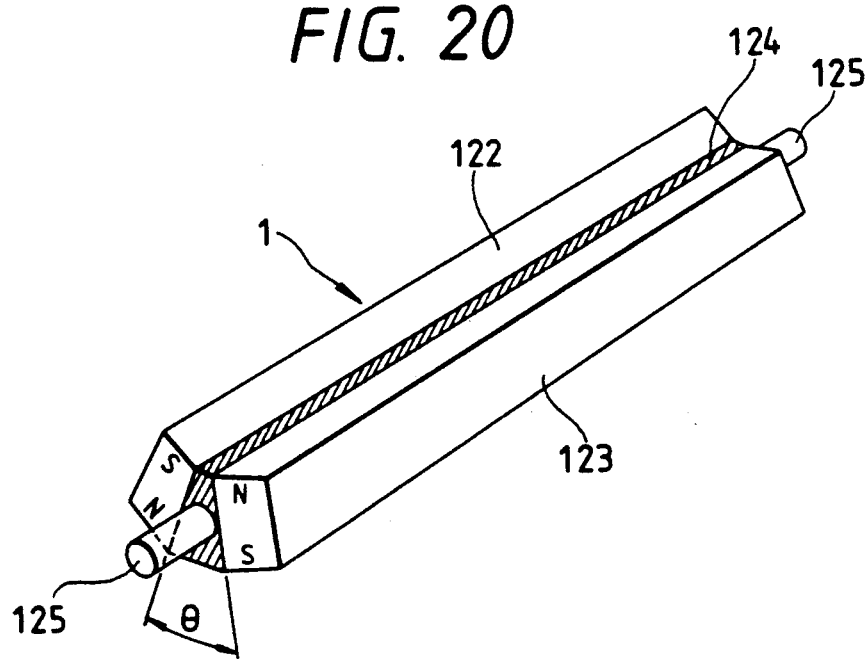
FIG. 20 is a perspective view of a portion of a bias magnetic field generating apparatus according to a fifth embodiment of this invention.

FIG. 20 shows a fifth embodiment of this invention which is similar to the embodiment of FIG. 20 except that a non-magnetic member 124 has oblique side surfaces so that magnet members 122 and 123 are inclined to each other at an angle $\theta$. The angle $\theta$ between the magnet members 122 and 123 is chosen so as to optimize the distribution of a magnetic field applied to a magneto-optical disk.

Figure 21:
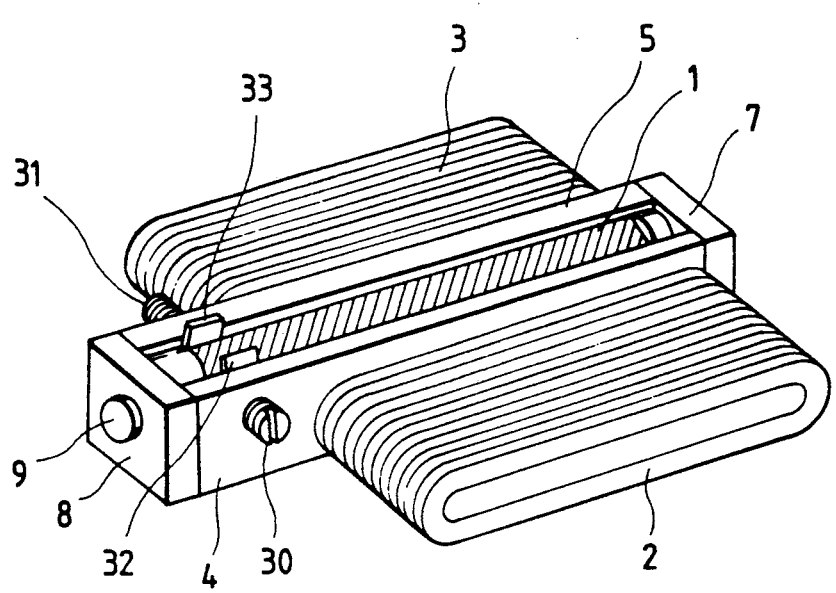
FIG. 21 is a perspective view of a portion of a bias magnetic field generating apparatus according to a sixth embodiment of this invention.
Figure 22:
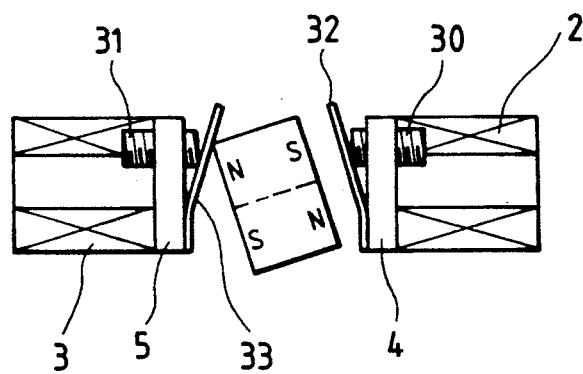
FIG. 22 is a sectional diagram of a portion of the bias magnetic field generating apparatus of FIG. 21.

FIGS. 21 and 22 show a sixth embodiment of this invention which is similar to the embodiment of FIGS. 7-16 except for design changes explained hereinafter. In the embodiment of FIGS. 21 and 22, a screw 30 extends through and is movably supported by a plate 4. The screw 30 engages a leaf spring 32 whose one end is fixed to an inner surface of the plate 4. Similarly, a screw 31 extends through and is movably supported by a plate 5, and the screw 31 engages a leaf spring 33 whose one end is fixed to an inner surface of the plate 5. The positions of free ends of the leaf springs 32 and 33 can be adjusted by the screws 30 and 31 respectively. The leaf springs 32 and 33 serve as stoppers for a magnet 1 and determine first and second predetermined effective positions of the magnet 1. The first and second effective positions of the magnet 1 can be adjusted by the screws 30 and 31. Thus, a magnetic field, which is applied to a magneto-optical disk when the magnet 1 assumes the first or second effective position, can be adjusted.

What is claimed is:

1. An apparatus for generating a bias magnetic field to a magneto-optical disk, comprising:
   a rotatable magnet for generating a bias magnetic field;
   means for generating a drive magnetic field to rotate the magnet; and
   stopping means being engageable with the magnet for stopping the magnet and defining a range of rotation of the magnet, wherein the rotation range corresponds to an angle of 90 degrees or less.

2. The apparatus of claim 1 further comprising means for moving the stopping means to adjust the rotation range.

3. The apparatus of claim 1 further comprising means working cooperatively with the magnet for urging the magnet toward a predetermined neutral position.

4. The apparatus of claim 1 wherein the magnet has a 4-pole structure.

5. The apparatus of claim 1 further comprising means working cooperatively with the magnet for decelerating the magnet and smoothly stopping the magnet.

6. The apparatus of claim 1 further comprising means for selectively activating and deactivating the drive-field generating means.

* * * * *